Sept. 13, 1955  N. S. MYERS  2,717,988
SIMULATED TYPE INDICATOR FOR VEHICLE LIGHT CONDITION
Filed April 24, 1953  2 Sheets-Sheet 1
Fig. 1
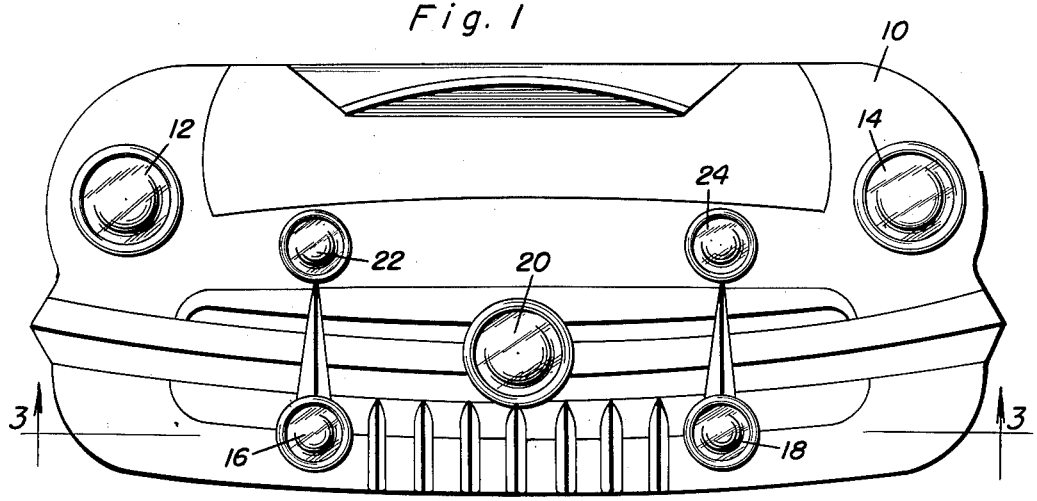
Fig. 2
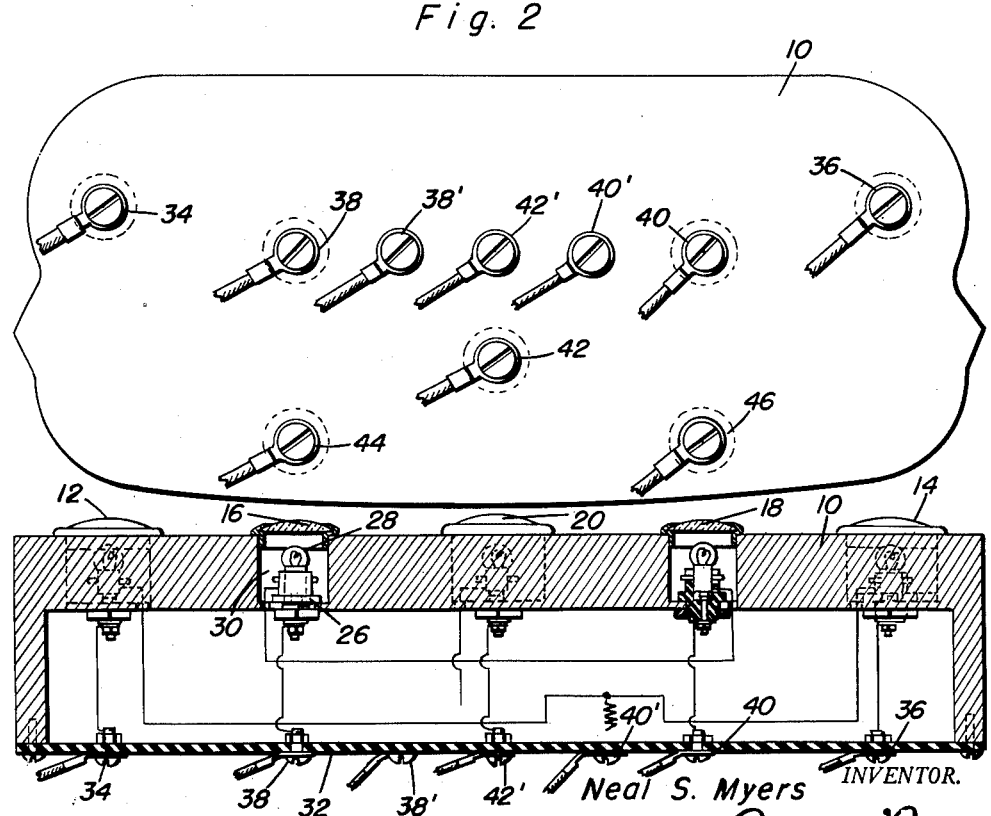
Fig. 3
Neal S. Myers INVENTOR.
BY *Clarence A. O'Brien and Harvey B. Jacobson*
Attorneys

United States Patent Office 2,717,988
Patented Sept. 13, 1955

2,717,988

SIMULATED TYPE INDICATOR FOR VEHICLE LIGHT CONDITION

Neal S. Myers, Williamsport, Md.

Application April 24, 1953, Serial No. 350,969

2 Claims. (Cl. 340—225)

This invention relates to an automobile accessory and more particularly to a device for informing an operator of a motor vehicle of the condition of his illuminating lamps and of the condition of the signal lamps such as turn indicators and stop lights.

The primary object of this invention resides in the provision of a device which will readily inform an operator of a motor vehicle of the condition of the head lights and tail lights of the automobile or other vehicle which he is operating.

The construction of this invention features the installation of a highly attractive panel configurated to simulate the front end of the vehicle on which suitable indicator lamps have been installed representing the various indicating lamps and signal lamps attached to the vehicle. Hence, the selective excitation of the indicator lamps will represent to the operator of the vehicle whether or not the illuminating lamps and signal lamps are functioning properly.

Still further objects of the invention reside in the provision of an indicator which is strong and durable, simple in construction and operation, capable of being readily mounted on the instrument board of various existing makes and models of motor vehicles, and which is pleasing and unobtrusive in appearance while being comparatively inexpensive to manufacture and install.

These, together with the various ancillary objects and features of the invention which will become apparent as the following description proceeds, are attained by this indicator, a preferred embodiment of which has been illustrated in the accompanying drawings, by way of example only, wherein:

Figure 1 is a front elevational view of the indicator panel comprising the present invention showing the manner in which the indicator lamps can be secured in substantially the relative locations that the illuminating and signal lamps which indicator lamps represent are located on the vehicle;

Figure 2 is a rear elevational view of the indicator panel;

Figure 3 is a horizontal sectional view as taken along the plane of the line 3—3 in Figure 1 illustrating the construction of the indicator panel in greater detail; and, Figure 4 is a wiring diagram illustrating the various component parts of the electrical system utilized.

Figure 4:
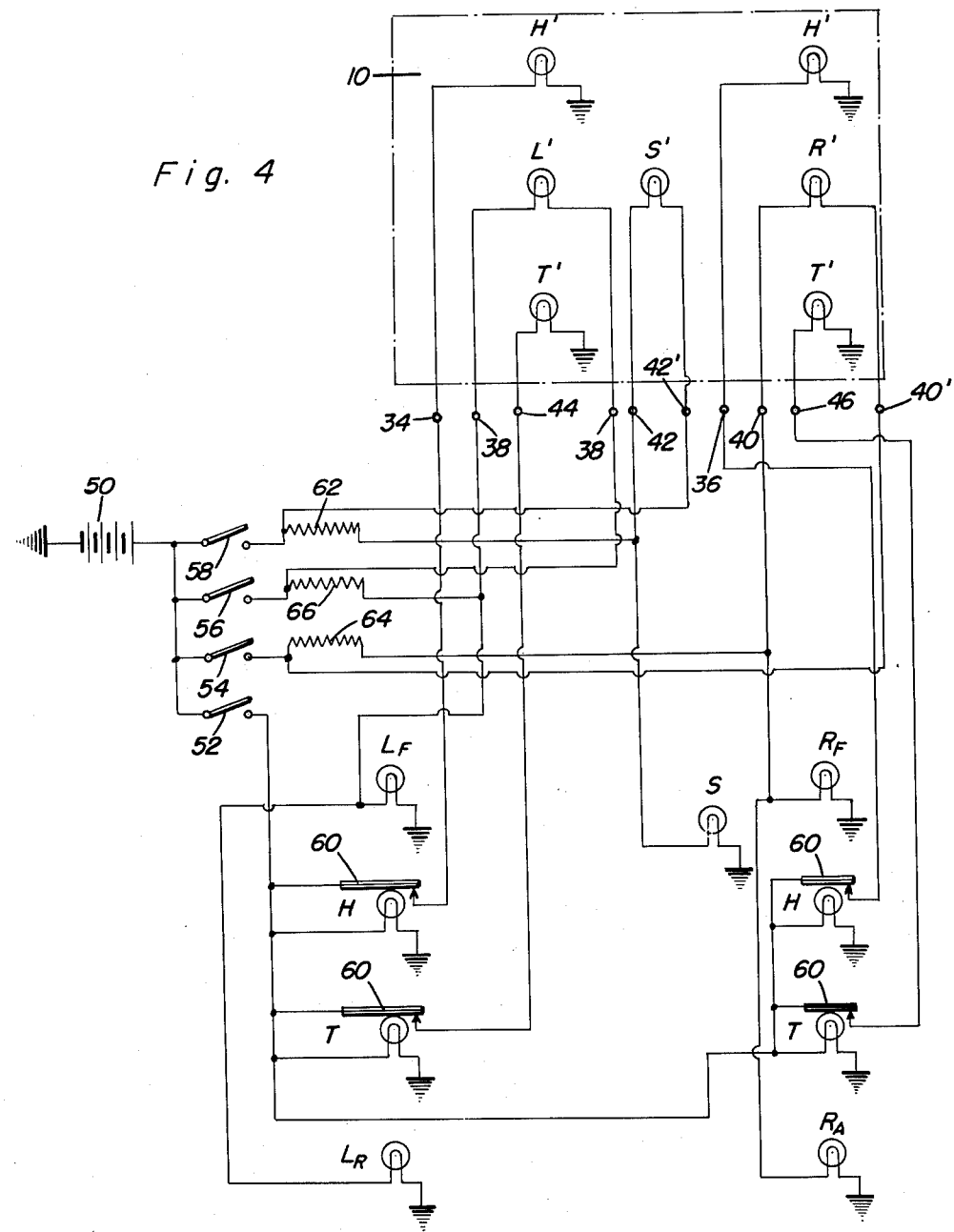

With continuing reference to the accompanying drawings wherein like reference numerals designate similar parts throughout the various views, reference numeral 10 generally designates an indicator panel formed from any suitable material such as metal or various synthetic plastics and which is painted or otherwise finished in comformance with the general interior decor of the motor vehicle on the instrument board of which it is adapted to be mounted. This indicator panel 10 is configurated to conform to the contours of the front end of the motor vehicle on which it is to be installed and has mounted thereon transparent lenses 12 and 14 representing the headlights of the vehicle and located in the relative position as would normally be occupied by the actual headlights with which the vehicle is equipped. Likewise, lenses 16 and 18 are provided to simulate the tail-lights while lens 20 is provided to simulate the brake actuated stop light. Other lenses 22 and 24 are provided for simulation of the turn indicator lights provided.

Within the panel 10 there are mounted sockets as at 26 behind each of the lenses representing the various illuminating and signal lamps. These sockets 26 are adapted to receive indicator lamps 28 for providing illumination to shine through the various lenses. The sockets 26 are mounted within the recesses 30 within the casing 10 and the respective lenses may be frictionally removably secured to the casing 10 over the lamps 28. The casing 10 has a back panel 32 which is removably secured thereto. Suitable terminals 34 and 36 are connected to the lamps 28 behind the lenses 12 and 14. Terminals 38 and 40, 38' and 40' are electrically connected to the lamps behind the lenses 22 and 24 representing the turn indicator signal lamps. Likewise, terminals 42, 42' are electrically connected to the lamp 28 representing the stop light and terminals 44 and 46 are connected to the lamps 28 behind the lenses 16 and 18 representing the tail-lights.

Referring now particularly to Figure 4 wherein is shown the circuit diagram illustrating the electrical connections utilized in this invention, it will be noted that a direct current source of power supply 50 is connected through a series of switches as at 52 for the head and tail-lights, 54 and 56 representing the left and right turn indicator switches, and 58 representing the brake actuated switch for actuating the stop light; to the head and tail-lights represented by symbols H and T respectively, the front turn indicator lights represented by $L_F$ and $R_F$ and the the rear turn indicator lights represented by $L_R$ and $R_R$ and the stop light represented by S. The electrical power source 50 is of course grounded, as are the various signal and illuminating lamps. The indicator panel 10 has the lamps mounted therein connected in various manners to the source of electrical power 50. The lamps 28 representing the headlights and tail-lights and designated H' and T' are connected in parallel to the head lamps H and tail lamps T. Suitable thermostatically actuated switches 60 are positioned immediately adjacent the head lamps H and tail lamps T. The thermostatic switches 60 will almost immediately move to a circuit open position due to the heat generated by the head lamps and tail lamps when excited. Should any of the head lamps or tail lamps fail the switch 60 immediately adjacent thereto would close thus closing the circuit through the indicator lamp representing the head lamp or tail lamp failing.

A comparatively low value resistor 62 is provided which provides a parallel connection for the indicator lamp representing the stop light S of the vehicle with the stop light S. Hence, upon actuation of the brake the switch 58 would close actuating both the stop light S and the indicator lamp S'. The switches 54 and 56 are connected through resistors 64 and 66 to the indicator lamps R' and L' respectively so as to reduce the power supply to these indicator lamps R' and L' which are thus connected in parallel with the turn indicator lights $R_R$, $R_F$, $L_R$ and $L_F$ respectively. Hence, upon actuation of the turn indicator lights by the closure of the switches 54 and 56, the indicator lamps R' and L' will flash on and off respectively. Thus, at a glance the operator of the vehicle can determine whether or not the illuminator lamps comprising the headlights and tail-lights and the signal lamps comprising the stop light and the turn indicator lights are functioning properly.

Since from the foregoing, the construction and advantages of this indicator are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to.

What is claimed as new is as follows:

1. An indicator device for informing an operator of a motor vehicle of the condition of the illuminating lamps and signal lamps mounted thereon and electrically operatively connected to a source of electrical power comprising a panel configured to substantially simulate the front end of the motor vehicle, indicator lamps mounted on said panel at locations substantially conforming to the relative locations of said illuminating and signal lamps, means interconnecting said illuminating and signal lamps with said indicator lamps for selective excitation of said indicator lamps, and means for attaching said panel to the instrument board of an automotive vehicle.

2. An indicator device for informing an operator of a motor vehicle of the condition of the illuminating lamps and signal lamps mounted thereon and electrically operatively connected to a source of electrical power comprising a panel configured to substantially simulate the front end of the motor vehicle, tell-tale means mounted on said panel for indicating the condition of said illuminating and signal lamps, said tell-tale means including indicator lamps mounted on said panel at locations substantially conforming to the relative locations of said illuminating and signal lamps, and means interconnecting said illuminating and signal lamps with said indicator lamps for selective excitation of said indicator lamps.

References Cited in the file of this patent
UNITED STATES PATENTS

| | | |
|---|---|---|
| 1,706,986 | Ryder | Mar. 26, 1929 |
| 2,020,164 | Stocks | Nov. 5, 1935 |
| 2,075,669 | Smith et al. | Mar. 30, 1937 |
| 2,100,695 | Lackey | Nov. 30, 1937 |
| 2,223,201 | Beebe et al. | Nov. 26, 1940 |
| 2,358,332 | Kennett | Sept. 19, 1944 |
| 2,526,057 | Whitley, Jr. | Oct. 17, 1950 |